No. 728,790. PATENTED MAY 19, 1903.
W. L. WEST.
MEASURING INSTRUMENT.
APPLICATION FILED DEC. 23, 1902.
NO MODEL.
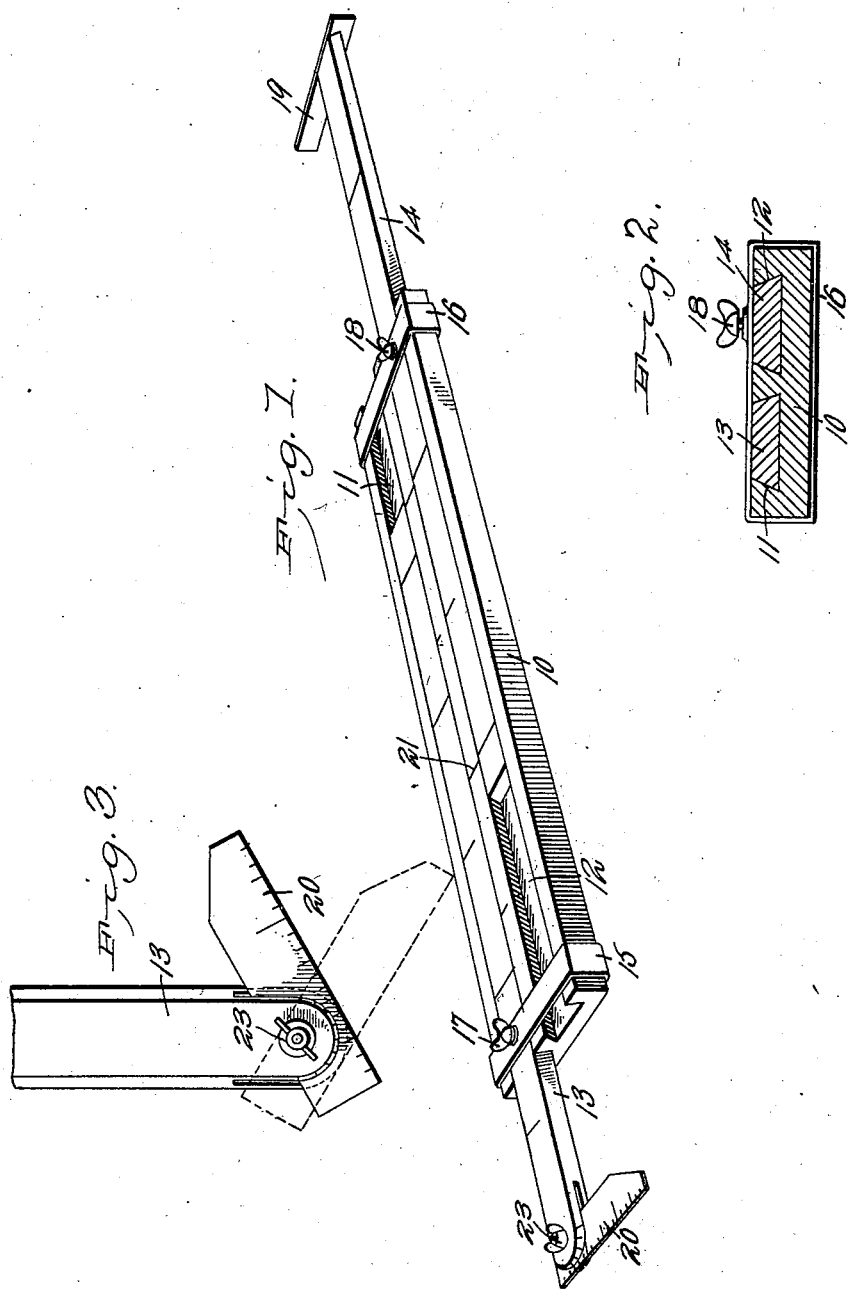

No. 728,790. Patented May 19, 1903.

UNITED STATES PATENT OFFICE.

WASHINGTON LEE WEST, OF WEST UNION, WEST VIRGINIA.

MEASURING INSTRUMENT.

SPECIFICATION forming part of Letters Patent No. 728,790, dated May 19, 1903.

Application filed December 23, 1902. Serial No. 136,395. (No model.)

*To all whom it may concern:*

Be it known that I, WASHINGTON LEE WEST, a citizen of the United States, residing at West Union, in the county of Doddridge and State of West Virginia, have invented a new and useful Measuring Instrument, of which the following is a specification.

This invention relates to measuring instruments, more particularly for the use of carpenters and other mechanics in accurately measuring the distance between different parts of structures not easily accessible by ordinary measuring instruments, and has for its object the production of a simply-constructed and easily-applied device by which the desired results may be attained; and the invention consists in certain novel features of the construction, as hereinafter shown and described, and specified in the claim following.

In the drawings illustrative of the invention, in which corresponding parts are denoted by like designating characters, Figure 1 is a perspective view of the improved implement partly distended. Fig. 2 is a transverse section enlarged. Fig. 3 is an enlarged detail view of the adjustable foot portion of the device.

The improved device may be employed for measuring the interval between many classes of objects, but is more particularly designed for the use of carpenters and other mechanics in measuring the distances between otherwise inaccessible points and will generally be constructed with special reference to such employment, but may be used in connection with any work to which it is adapted.

The improved implement consists in a stock or base portion 10, having spaced longitudinal channels 11 12 in one of its side surfaces, the sides of the channels being preferably undercut or "dovetailed," as shown in Fig. 2. Within the channels 11 12 are slidably disposed rods 13 14, the rods having inclined edges corresponding to and closely engaging the inclined sides of the channels, as shown.

Surrounding the base member 10 near its ends are metal bands 15 16, secured in any suitable manner thereto, the band 15 having a set-screw 17, adapted to engage the rod 13, and the band 16 having a similar set-screw 18, adapted to engage the rod 14, by which means the rods may be locked in any desired position relative to the base portion, as will be obvious.

The rods 13 14 are adapted to be moved in opposite directions longitudinally of the base portion 10, the outer end of the rod 14 being provided with a laterally-extending cap member 19 and the outer end of the rod 13 provided with an adjustable laterally-extending foot member 20, as shown.

The intermediate portion or rib of the channeled side of the base member 10 will be graduated, as shown at 21, and the adjacent surfaces of the rods 13 14 will be correspondingly graduated, and these graduations may be in feet and fractions of feet or graduated according to the metric or any other desired system or standard of measurement.

When the implement is in use, the cap member 19 insures the correct position relative to the objects to be measured by causing the implement to be held at right angles thereto, and when the movable foot member is likewise adjusted to a right-angled position relative to the rod 13 the accuracy of the measurement is still more positively assured. Then if a sloping or inclined surface is to be measured the foot member 20 may be adjusted to correspond to the slope and the inclination thereby also accurately ascertained. The joint of the foot member 20 may be arranged in graduations to denote the degree of angularity of the foot member relative to the rod 13, the foot member being held in place by a clamp-screw 23, as shown.

In practice the base member 10 will be one-third the total length of the implement when distended plus the "lap" beneath the bands 15 16. Thus for an implement which will measure ten feet the base member will be three and one-third feet plus the necessary lap of the rods beneath the bands to insure their proper retention in place.

The implements may be constructed in various sizes and of any suitable material and employed for any desired purpose and may be modified and changed in minor particulars without departing from the principle of the invention or sacrificing any of its advantages.

Having thus described the invention, what I claim is—

A measuring instrument comprising a stock having spaced longitudinal channels formed in one face thereof, bars slidably disposed in said channels, one of said bars being provided with a flat lateral extension at one end thereof and the other bar having a laterally-extended, movable foot member adjustably connected to one terminal thereof, bands enclasping said stock and bars and carrying set-screws for locking said bars to said stock, a graduated rib disposed between said bars and having graduations for registering with graduations on the adjacent edges of the bars to permit a predetermined adjustment of the bars.

In testimony that I claim the foregoing as my own I have hereto affixed my signature in the presence of two witnesses.

WASHINGTON LEE WEST.

Witnesses:
D. P. STOUT,
M. BEE.